April 5, 1932.    R. T. CHEESEMAN    1,852,799
BATTERY CHARGING SYSTEM
Filed Oct. 19, 1929
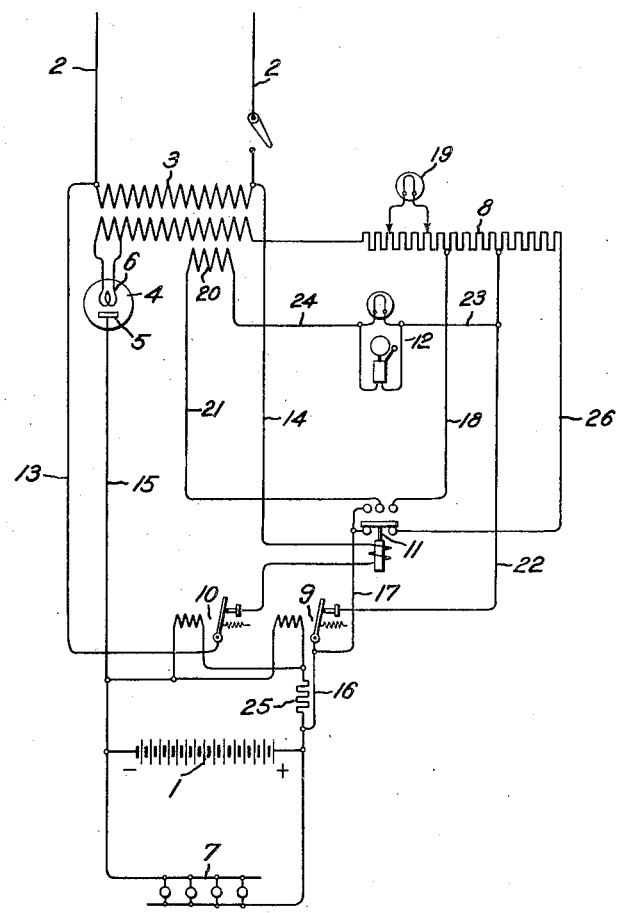
Inventor:
Ralph T. Cheeseman,
by Charles E. Tullar
His Attorney.

Patented Apr. 5, 1932

1,852,799

UNITED STATES PATENT OFFICE

RALPH T. CHEESEMAN, OF LYNN, MASSACHUSETTS, ASSIGNOR TO GENERAL ELECTRIC COMPANY, A CORPORATION OF NEW YORK

BATTERY CHARGING SYSTEM

Application filed October 19, 1929. Serial No. 400,946.

My invention relates to battery charging systems and particularly to a trickle charging system for batteries.

More particularly it relates to an automatically operating system whereby the battery is charged at two different rates depending upon its state of charge. Means are also provided for boosting the charging rate in the event of a severe discharge.

It is common practice today to charge a battery continuously at such a uniform rate that it will be maintained in approximately a fully charged condition. This is done by adjusting the charging rate to such a value that it equals the average rate of discharge plus the rate necessary to maintain the battery in a fully charged condition. A uniform continuous charge of this character may be obtained from various devices, the well known trickle charger being perhaps the commonest example.

As the condition of a secondary battery is reflected in the cell voltage, the correct charging rate is obtained by measuring the cell voltage every few days and if it is too low to slightly raise the charging rate as by manually cutting out some series resistance in the circuit, while if it is too high, resistance is added. Such a system is only advantageous where the discharge rate is fairly uniform, for if the load is very variable and if the average discharge rate changes materially from day to day, a repeated readjustment is necessary.

In accordance with my invention I provide means for charging the battery at two different rates, one being higher than is necessary to keep the battery fully charged and the other being lower than is necessary to keep the battery fully charged. Thus, when the cell voltage falls below normal, the battery will be charged at a rate greater than that necessary to maintain it fully charged, while when the voltage rises above normal, the charging rate is cut to below that necessary to maintain the battery fully charged. It will, therefore, be clear that the average rate of discharge may be increased up to the high rate of charge without causing more than a slight departure from normal of the cell voltage and consequently the state of charge of the battery.

An object of my invention is to provide an improved means and method for charging electric storage batteries.

Another object of my invention is to provide improved means in connection with a battery charging system for automatically charging the battery at different rates and boosting the charging rate in the event of an abnormal discharge.

My invention will be bettter understood from the following description, taken in connection with the accompanying drawing, and its scope will be pointed out in the appended claims.

Referring to the single figure of the accompanying drawing, which is a diagrammatic representation of an embodiment of my invention, 1 is a storage battery which is connected to alternating current supply lines 2 through means comprising a transformer 3 and a rectifying device 4 of the space discharge type. This device contains a gas at low pressure, such as argon, and is provided with an anode 5 and a cathode 6 which receives its heating current from a portion of the secondary of the transformer 3 as shown. Rectifiers of this type are old and well known in the art. A load 7, represented as a lamp load, is connected across the battery. In circuit with the battery 1 and the rectifier 4, is a resistance 8, the purpose of which is to regulate the battery's charging rate. Also connected across the battery 1 are the coils of two relays, 9 and 10. Relay 9 is very sensitive to voltage changes, being designed to allow closure of its contacts and a consequent increase in the charging rate of the battery through the shunting of the right hand section of resistance 8, as soon as the cell voltage of the battery drops slightly below normal. Relay 10 has not the sensitive adjustment of relay 9, and is designed to close its contacts, thus completing a circuit which energizes the coil of relay 11, only when the cell voltage of the battery is indicative of an advanced state of discharge of the battery. Relay 11 when energized completes a circuit which short circuits all but the left hand section of resistance 8, thus providing for charging the battery at what may be termed the boost rate. Relays 9, 10 and 11 also jointly control an under-voltage signal 12 through circuits which will be designated in the description of the operation of my invention which follows.

The drawing shows the various elements in the positions they occupy when the battery is in an advanced state of discharge and the alternating current supply lines 2 are deenergized.

Assuming that the supply lines become energized by the closure of the switch in left hand line 2, a circuit will be immediately completed from one of the lines 2, the left hand one for example, through wire 13, contacts of relay 10, coil of relay 11, and the other supply line 2 through wire 14. The energization of the coil of relay 11 immediately causes the movable contact of the relay to rise and bridge the three upper fixed contacts. A second circuit will then be established from the plate 5 of the trickle charger tube, wire 15, battery 1, wire 16, wire 17, the outer fixed contacts of the movable contact of relay 11, wire 18, left hand portion of resistance 8 and back to the charger. The battery will then be charging at its highest or boost rate as there is a minimum of resistance in the circuit. The current through this section of resistance 8 causes a voltage drop sufficient to light lamp 19, the boost signal, which is connected across a portion of this section. A third circuit, containing the under-voltage signal 12 will also be completed as follows: From a low voltage winding 20 on the trickle charger, wire 21, left hand fixed contacts on the movable contact of relay 11, wire 17, contacts of relay 9, wire 22, wire 23, under-voltage signal 12 and back to the low voltage winding through wire 24.

The coils of relays 9 and 10 are connected across the battery 1 and as shown are in series with the resistance 25, the purpose of which is to keep down the current and hence the heating losses in these coils.

For the purpose of illustration, it is assumed that a cell voltage of 2.15 volts represents the ideal state of charge of the battery 1. Relay 10 may then be designed so as to open at 2.30 volts per cell and close at 2.05 volts per cell. Relay 9, which regulates the two-rate charge may be designed to open at 2.16 volts per cell and close at 2.14 volts per cell. Therefore, as the battery becomes charged at the boost rate, the cell voltage will eventually reach 2.16. When this occurs, contacts of relay 9 open and the under-voltage signal circuit is broken. The cell voltage will gradually rise until it reaches 2.30, when relay 10 will cut out, breaking the circuit of the coil of relay 11, which causes the movable contact to drop and break the boost rate charging circuit.

The battery will now be charging at the lowest rate through the following circuit, trickle charger tube, wire 15, battery 1, wire 16, wire 17, lower fixed contacts and movable contacts of relay 11, wire 26, total resistance 8 and back to the charger. The rate of charge with all the resistance cut in is lower than the average rate of discharge, plus the rate necessary to maintain the battery in a fully charged condition, hence the cell voltage will gradually drop to 2.14 volts per cell when relay 9 will close. This has the effect of shunting the right hand portion of resistance 8, the circuit being as follows: trickle charger, wire 15, battery 1, wire 16, contacts of relay 9, wire 22, resistance 8 and back to the charger. The charging rate with the right hand section of resistance 8 shunted is greater than the average rate of discharge plus the rate of charge necessary to maintain the battery fully charged, hence the cell voltage will gradually climb to 2.16, when the relay will cut out again. The battery will, therefore, be kept approximately fully charged and at approximately a cell voltage of 2.15, regardless of the considerable fluctuation in the average rate of discharge from day to day.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is—

1. In a battery charging system, a battery, discharging means for said battery, a source of charging current connected thereto, a resistance connected in series with said battery and said source of current, means responsive to an under-charged condition of said battery for short circuiting a portion of said resistance, additional means responsive to a more advanced state of discharge of said battery for short-circuiting a greater portion of said resistance, and a signal operative in accordance with the con-current actuation of the above-mentioned short-circuiting means.

2. In a battery charging system, a battery, discharging means for said battery, a resistance, a source of charging current for said battery, means responsive to the state of charge of said battery for connecting said battery through different portions of said resistance, depending upon the state of charge of said battery, and additional means responsive only to an abnormal discharge state of said battery for connecting said battery to said source through a relatively small portion of said resistance and maintaining said connection until the battery is fully charged.

3. In a battery charging system, a battery, discharging means for said battery, a source of charging current for said battery, a resistance, means responsive to the state of charge of said battery for connecting said battery to said source of current through various portions of said resistance depending upon the state of charge of said battery, additional means responsive only to an abnormally discharged state of said battery for connecting said battery to said source through a relatively small portion of said resistance and maintaining said connection until the battery is fully charged, and a signal connected across said last mentioned portion of the resistance and operative only by the resistance drop therein during the last mentioned connection.

4. The method of charging a storage battery which has a variable load connected thereto which consists of alternately charging it at rates above and below a predetermined rate when the battery is above a predetermined state of charge inaugurating charging at a rate higher than said rate above the predetermined rate when the battery is a predetermined amount below said predetermined state of charge and maintaining said higher rate until the state of charge of said battery is above the state of charge attained by said rate which is above said predetermined rate.

5. The combination with a storage battery, of a variable load connected thereto, and means for charging said battery, said means including two battery voltage responsive relays, one of said relays operating between voltage limits which are respectively above and below the normal full charge voltage of said battery, said relay controlling means for varying the rate of charge of said battery, said other relay operating between voltage limits which are respectively above and below the operating voltage limits of said first relay, said other relay controlling means for charging said battery at a rate which is higher than the highest rate produced by the means controlled by the first relay.

6. In combination, a supply circuit, a load connected to said supply circuit, a storage battery connected to said supply circuit, means responsive to the state of charge of said battery for alternately charging it at relatively high and low rates, and means responsive to an advanced state of discharge of said battery for charging it at a rate higher than said high rate of charge until said battery reaches a state of charge which is higher than the state at which said first mentioned means ordinarily causes a change from the high to the low charging rate.

7. In combination, a supply circuit, a load connected to said supply circuit, a storage battery connected to said supply circuit, means responsive to the state of charge of said battery for alternately charging it at relatively high and low rates, means responsive to an advanced state of discharge of said battery for charging it at a rate higher than said high rate of charge until said battery reaches a state of charge which is higher than the state at which said first mentioned means ordinarily causes a change from the high to the low charging rate, and means for giving a signal during the entire operation of said last mentioned means.

8. In combination, a supply circuit, a load connected to said supply circuit, a storage battery connected to said supply circuit, means responsive to the state of charge of said battery for alternately charging it at relatively high and low rates, means responsive to an advanced state of discharge of said battery for charging it at a rate higher than said high rate of charge until said battery reaches a state of charge which is higher than the state at which said first mentioned means ordinarily causes a change from the high to the low charging rate, and means for giving a signal during that portion of the time of operation of said last mentioned means when said battery is below said relatively low state of charge.

In witness whereof, I have hereunto set my hand this 17th day of October, 1929.

RALPH T. CHEESEMAN.